United States Patent Office 3,580,952
Patented May 25, 1971

3,580,952
PROCESS FOR PURIFYING POLYETHER AMINES
Albrecht Moschel, Kelkheim, Taunus, Germany, assignor to Farbwerke Hoechst Aktiengesellschaft vormals Meister Lucius & Bruning, Frankfurt am Main, Germany
No Drawing. Filed Jan. 11, 1968, Ser. No. 697,016
Claims priority, application Germany, Jan. 18, 1967, F 51,273
Int. Cl. *C07c 89/04*
U.S. Cl. 260—584                3 Claims

ABSTRACT OF THE DISCLOSURE

A process for purification of polyether amines by removing oxides, salts or complex compounds of nickel or cobalt therefrom, which comprises stirring 1 to 500 percent by volume of a lower alkanol and 0.05 to 10 percent by volume of water into the crude product, adding an inert solid drying agent, filtering off the solid substances, removing the alkanol, and heating the product until the weight remains constant.

---

The present invention relates to a process for purifying polyamines by removing the mainly inorganic impurities.

It has already been proposed to subject low molecular weight mono- or polyfunctional amines after their manufacture to a distillation in order to purify them not only from by-products and organic impurities but also from inorganic salts and complex compounds which have got into the product chiefly by contact with hydrogenation catalysts. It is desirable to free also high molecular weight polyamines from such impurities because the latter strongly limit or even prohibit the application of said compounds.

The manufacture of branched or unbranched long-chain molecules from simple monomers such as carbon monoxide, olefins, for example ethylene or propylene, olefin oxides, for example ethylene oxide or propylene oxide, polyhydric alcohols, for example ethylene glycol, trimethylol propane, glycerol and pentaerythritol, and acrylonitrile as well as the subsequent introduction of the amino group, either by substitution of hydroxyl groups, reduction of nitrile groups or reductive amination of carbonyl groups always yields more or less coloured polyamines which have gained only little importance in spite of the easily accessible starting products. This is especially due to the fact that the said polyamines, when processed, yield unattractive products which can be used in the field of lacquers and varnishes to a limited extent only.

It is a common feature of the above processes that the subsequent introduction of the amino group into the long-chain molecule is performed in the presence of a hydrogenation catalyst consisting mainly of an element of subgroup 8 of the Mendeleeff Periodic Table. Another common feature is that it is no longer possible to distil the reaction mixture which contains finely dispersed metal oxides, dissolved salts or complex compounds which have passed over from the said catalyst into the polyamine at the high reaction temperatures necessary for these reactions. The polyamine so obtained therefore contains inorganic impurities which cause not only a more or less pronounced discoloration and largely limit the applicability of the products but also strongly reduce the chemical resistance of the amines and secondary products thereof by catalysis of air oxidation.

To the above polyamines there belong, for example, amines which can be obtained by a reductive amination of copolymers of olefins and carbon monoxide with ammonia and hydrogen in the presence of nickel catalysts at temperatures of from 200 to 250° C. There may also be mentioned di- and polyamines obtained by the reduction of di- and polycyanoethyl ethers of at least bivalent hydroxy compounds in the presence of hydrogenation catalysts, for example ®Raney nickel or a Raney cobalt. In this case, reduction takes place under considerably milder conditions at about 120° C., but only in very rare cases light, water-clear products can be obtained which need not subsequently be purified by distillation. Such a purification process is, however, complicated and limited to low molecular weight γ-aminopropyl ethers. It cannot be applied, for example, to γ-aminopropyl ethers of polypropylene glycols and triols of a molecular weight within the range of from 200 to 5000. Of importance are also polyether amines obtained by aminolysis of the terminal hydroxyl groups of polyoxypropylene adducts or polyoxyethylene adducts with ammonia in the presence of hydrogenation catalysts, for example Raney nickel, at temperatures of 200 to 250° C. By carrying out such aminolyses in the presence of water, discolorations caused by inorganic impurities can be reduced but not completely avoided, since too high an addition of water requires not only an unnecessarily high expenditure as regards the addition of large amounts of an inert drying agent but gives also rise to great losses of polyamine during filtration.

The present invention provides a process for removing mainly inorganic impurities, particularly oxides, salts or complex compounds of elements of sub-group 8 of the Mendeleeff Periodic Table, from polyethers or copolymers of olefins, each containing at least two amino groups, which comprises stirring 1 to 500% by volume, advantageously 5 to 100% by volume, of a low alcohol with 1 to 4 carbon atoms, preferably methanol or ethanol, and 0.05 to 10% by volume, advantageously 0.5 to 5% by volume, of water into the crude product of polyamine, adding an inert solid drying agent and filtering off the solid substances. By this simple measure, combined with a subsequent removal of the alcohol by distillation and heating until the weight of the polyamine remains constant, clear light polyamines which are substantially free from inorganic impurities are obtained.

The process of the invention is particularly important for the purification of polyether amines which may still contain 0.1 to 50%, depending on the manufacturing process, of hydroxyl groups which have not been reacted. Such compounds are the easily accessible products obtained by aminolysis of polyoxyethyl- or polyoxypropyl diols, triols and polyols of the following Formula I $$Z-[(OR)_n-X]_m \qquad (I)$$

in which R stands for a bivalent aliphatic radical with 2 or 3 carbon atoms, Z is an at least bivalent aliphatic, cycloaliphatic, araliphatic or aromatic radical, $m$ is an integer of 2 to 6, $n$ is an integer of 1 to 50 and X stands for an amino or hydroxyl group.

The process in accordance with the invention can be used with particular advantage for purifying compounds of the following Formulae II and III

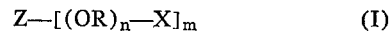

(II)

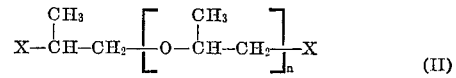

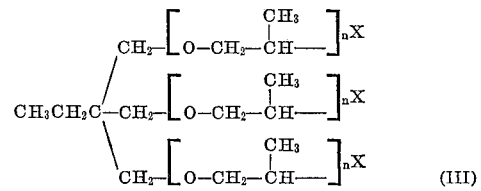

(III)

in which $n$ and X have the meanings given above.

When the above products obtained by aminolysis of poly-1,2-propylene glycols (II) of a molecular weight within the range of 200 to 2500 and of polyoxypropyl trimethylol propanes (III) of a molecular weight within the range of 300 to 5000 are purified only once using the process of the invention, transparent completely clear products free from complex compounds of nickel and cobalt which may give rise to discolorations and favor oxidative degradation are obtained. When, for example, a linear polyether amine of the above Formula II of a molecular weight of 400 in which the hydroxyl groups have been exchanged to an extent of 92% for amino groups in the absence of water, is separated from the catalyst by filtration and heated until the weight remains constant, the product undergoes a green discoloration and contains 0.034% of inorganic ash which consists almost exclusively of nickel as determined by spectroscopy. When 25% by volume of methanol, containing 10% by volume of water is added directly after the reaciton, 5% by weight, calculated on the total amount, of magnesium sulfate is then stirred in and the catalyst and drying agent are subsequently filtered off, a yellowish clear product is obtained, which contains 0.001% of inorganic ash which is, however, free from nickel. It is advantageous to add a part of the water, preferably 0.5 to 5% by weight, calculated on the polyether used, already before the aminolysis reaction and then to proceed as indicated above. By proceeding in this manner there can be obtained, for example, branched polyether amines of the above Formula III which, with an exchange of 87.5% of the hydroxyl groups for amino groups, are colorless and water-clear and contain only 0.0007% of inorganic ash. Furthermore, by the addition of alcohol, the yield is considerably increased since owing to the lower viscosity the transference from the autoclave to the pressure filter and filtration itself can be carried out not only with smaller losses but also considerably faster.

The effect of the purification process of the invention is surprising. It could not be expected that in a solution which contains a low alcohol, e.g. methanol, and water in addition to the polyamine containing hydroxyl groups, the inorganic impurities contained in the polyamine mixture, particularly the amine-metal complex compounds of the hydrogenation catalysts, would be adsorbed so completely with the water by an inert solid drying agent, for example anhydrous sodium sulfate, magnesium sulfate or gypsum.

The purification process in accordance with the invention is not limited to polyether amines obtained by aminolysis, but is also applicable to polyether amines which have been obtained by cyanoethylation and subsequent catalytic reduction and to polyamines obtained by reductive amination.

The process of the invention is of considerable economic importance since it enables a large number of pure amines to be obtained in a simple manner from cheap starting products. The products obtained by the process in accordance with the invention can be used for the manufacture of polyamide moulding materials, epoxide casting resins, high quality light-stable epoxide and isocyanate lacquers and varnishes and binders for compound glass. Since the polyether amines obtained by the process of the invention have a low viscosity as compared with commercial amidoamines and amine-epoxide adducts, the technical hardening of the highly viscous epoxide resins can be considerably simplified because no reactive diluters need be added.

The following examples serve to illustrate the invention, but are not intended to limit it.

EXAMPLE 1

1000 grams of a linear polypropylene oxide of a hydroxyl number of 286.5 were placed in a 5-liter autoclave together with 80 grams Raney nickel and 0.5 gram zinc oxide. 1200 ml. liquid ammonia were introduced and the pressure was adjusted to 20 atmospheres gage with the help of hydrogen. The whole was then heated to 250° C. within 2 hours, stirred at that temperature for a further 3 hours, cooled to 40° C. and carefully released from pressure at that temperature. The product was removed from the autoclave and filtered off from the Raney nickel through a pressure filter.

(a) (Comparison) 250 grams of the filtrate were heated for 2 hours at 110° C. under 1 mm. of mercury until the weight remained constant. After filtration a clear green product was obtained, which had the following properties:

Total base nitrogen _____ 6.56%.
Sec. and tert. base nitrogen _____ 0.02%.
Inorganic ash _____ 0.034% containing almost exclusively nickel, little zinc as determined by X-ray spectrum.

(b) 150 ml. methanol and 15 ml. water and subsequently 30 grams magnesium sulfate were stirred into 600 grams of the filtrate. After filtration through a pressure filter, the methanol was distilled off under reduced pressure and the residue was heated for 2 hours at 110° C. under 1 mm. of mercury until the weight remained constant. After a further filtration a weakly yellowish clear product was obtained which, in addition to the above amine content, contained 0.001% of inorganic ash free from nickel.

EXAMPLE 2

1000 grams of a linear polypropylene oxide of a hydroxyl number of 286.5 were placed in a 5-liter autoclave together with 1 gram zinc oxide, 80 grams Raney nickel and 20 ml. water. 1200 ml. liquid ammonia were introduced and the pressure was adjusted to 20 atmospheres gage with the help of hydrogen. The reaction mixture was heated to 240° C. in 2 hours and kept at that temperature for a further 2 hours, the pressure dropping from 210 to 180 atmospheres gage. The autoclave was then cooled and carefully released from pressure at 40° C. The product was removed from the autoclave, while adding 200 ml. methanol, 5 ml. water and 50 grams anhydrous sodium sulfate were then stirred in and filtered off together with the catalyst through a pressure filter. After distilling off the methanol under reduced pressure and heating at 110° C. under 1 mm. of mercury until a constant weight had been obtained, a turbidity was filtered off. 960 grams of a water-clear polyether amine were obtained, which had the following properties:

Total base nitrogen _____ 6.19%.
Sec. and tert. base nitrogen __ 0.03%.
Inorganic ash _____ 0.001% containing chiefly sodium and zinc but no nickel as determined by X-ray spectrum.

EXAMPLE 3

(a) (Comparison) 1000 grams of a branched polypropylene oxide of a hydroxyl number of 390 were placed in a 5-liter autoclave together with 80 grams Raney nickel, 1 gram zinc oxide and 20 ml. water. 1200 ml. liquid ammonia were then introduced and the pressure was adjusted to 20 atmospheres gage with the help of hydrogen. The whole was heated to 240° C. within 3 hours, the pressure rising to 235 atmospheres gage. The reaction mixture was then kept at that temperature for a further 16 hours, the pressure dropping to 205 atmospheres gage in the course of the reaction. The autoclave was then cooled, the pressure released at 40° C. and the reaction product was removed from the autoclave. After adding 30 grams sodium sulfate while stirring, the solid substances were filtered off and the product was heated at 110° C. under 1 mm. of mercury until the weight remained constant. After a further filtration, the deep yellow product had the following properties:

Total base nitrogen _____ 6.73%.
Sec. and tert. base nitrogen __ 0.13%.
Inorganic ash _____ 0.25% containing about 30% nickel as determined by X-ray spectrum.

(b) 1000 grams of the polyether described in sub (a) were placed in a 5-liter autoclave together with 80 grams Raney nickel, 0.5 gram zinc oxide and 20 ml. water. 1200 ml. liquid ammonia were then added and the pressure was adjusted to 20 atmospheres gage with the help of hydrogen. The whole was heated to 250° C. within 2 hours and kept at that temperature for a further 6½ hours, the pressure dropping from 255 to 210 atmospheres gage in the course of the reaction. After cooling, the pressure was carefully released at 40° C. and the product was removed from the autoclave, while adding 300 ml. ethanol. After adding 15 ml. water and 30 grams magnesium sulfate while stirring, the solid substances were filtered off and the ethanol was distilled off under reduced pressure. The autoclave was then heated for 2 hours at 110° C. under 1 mm. of mercury until the weight remained constant and then a slight turbidity was filtered off. The water-white clear filtrate (850 grams) had the following properties:

Total base nitrogen _____ 8.55%.
Sec. and tert. base nitrogen __ 0.10%.
Inorganic ash _____ 0.0007% containing only very little nickel as determined by X-ray spectrum.

What is claimed is:
1. A process for purifying polyether amines by removing oxides, salts or complex compounds of nickel or cobalt, which have got into the polyether amines by contact with hydrogenation catalysts consisting of nickel or cobalt, said polyether amines having the formula

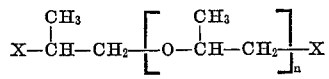

or the formula

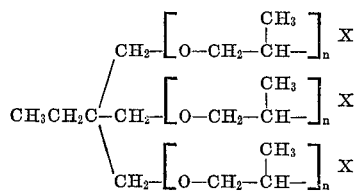

in which formulae $n$ is an integer of 1 to 50 and X stands for an amino or hydroxyl group, said polyether amines containing from 0.1 to 50% hydroxyl groups, which process comprises: stirring 1 to 500% by volume of a lower alkanol with 1 to 4 carbon atoms and 0.05 to 10% by volume of water into the crude product of polyamine; adding an inert solid drying agent selected from the group consisting of anhydrous sodium sulfate, magnesium sulfate and calcium sulfate; filtering off the solid substances; removing the alkanol; and heating the product until the weight remains constant.

2. The process of claim 1 wherein the amount of lower alkanol is 5 to 100% by volume and the amount of water is 0.5 to 5% by volume.

3. The process of claim 1 wherein the lower alkanol is methanol or ethanol.

References Cited

UNITED STATES PATENTS

| | | | |
|---|---|---|---|
| 3,016,404 | 1/1962 | Beauchamp et al. | 260—584(B)X |
| 3,040,076 | 6/1962 | Seidel et al. | 260—584(B)X |
| 3,341,599 | 9/1967 | Bormann et al. | 260—584(B) |
| 3,372,195 | 5/1968 | Little | 260—584(B)X |
| 3,428,683 | 2/1969 | Swenson et al. | 260—584(B) |

CHARLES B. PARKER, Primary Examiner

R. L. RAYMOND, Assistant Examiner

U.S. Cl. X.R.

260—583, 585